Patented Oct. 20, 1953

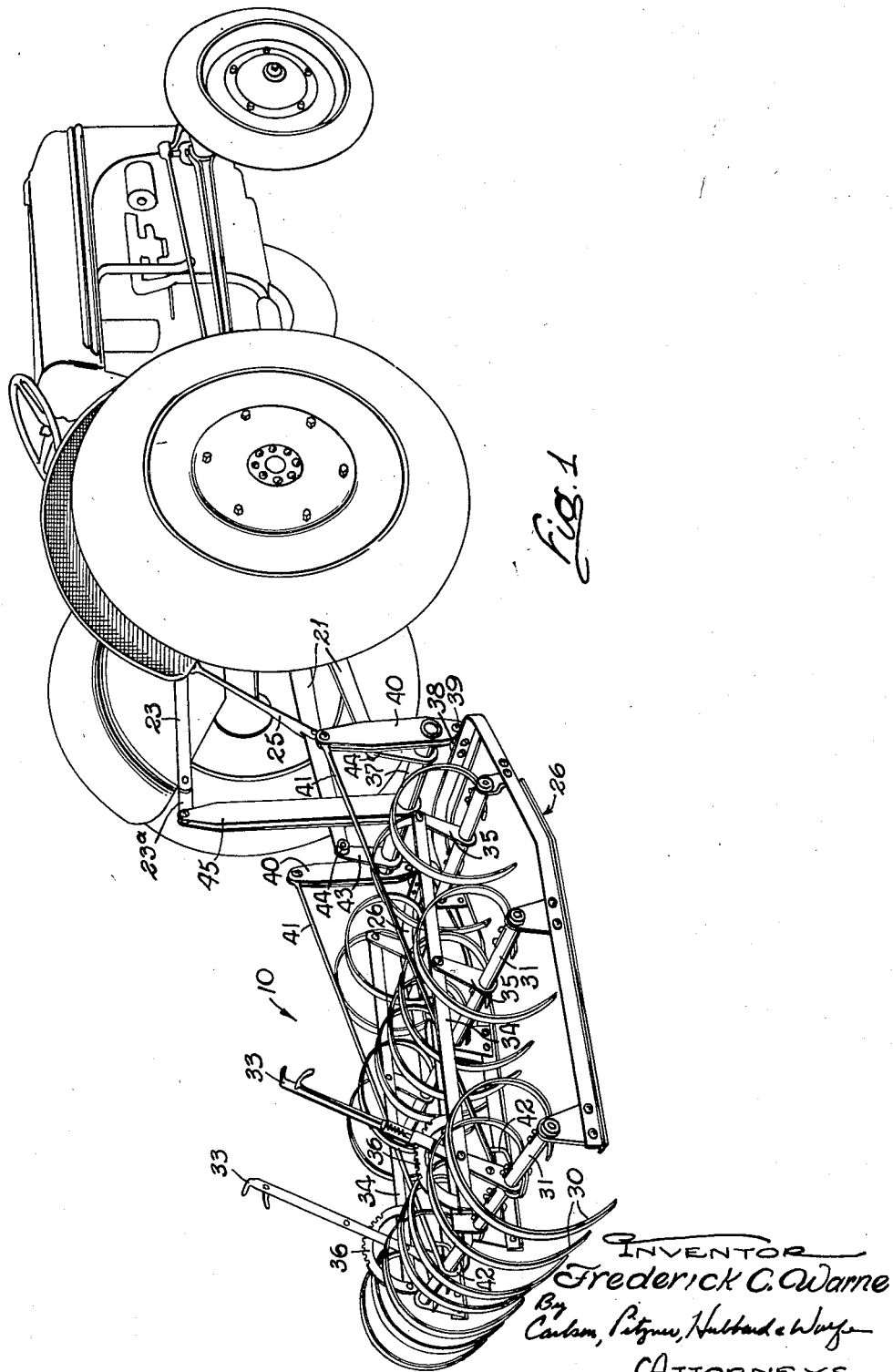

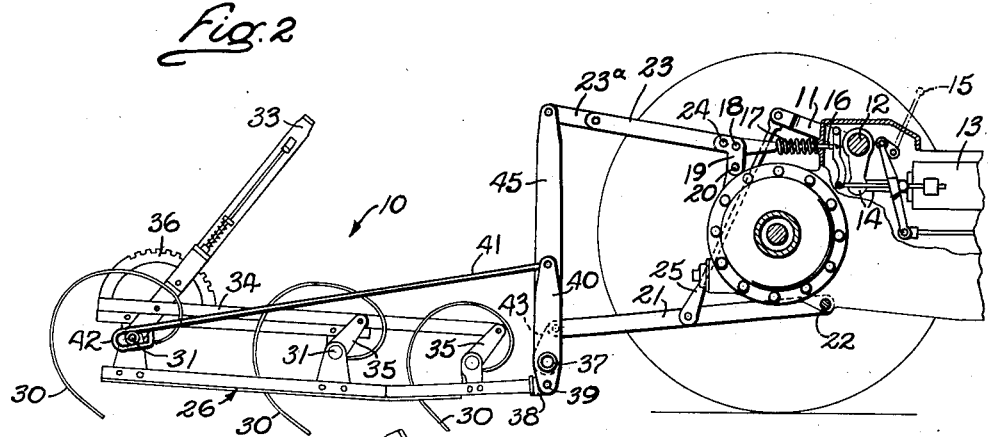
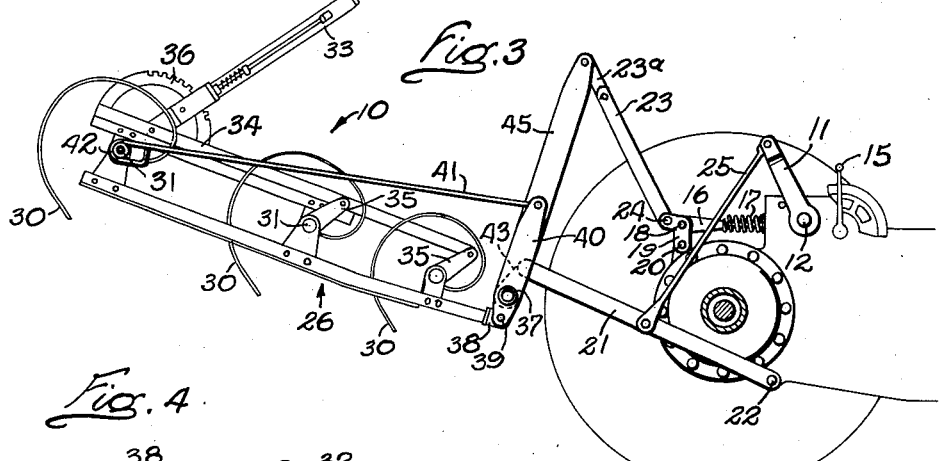
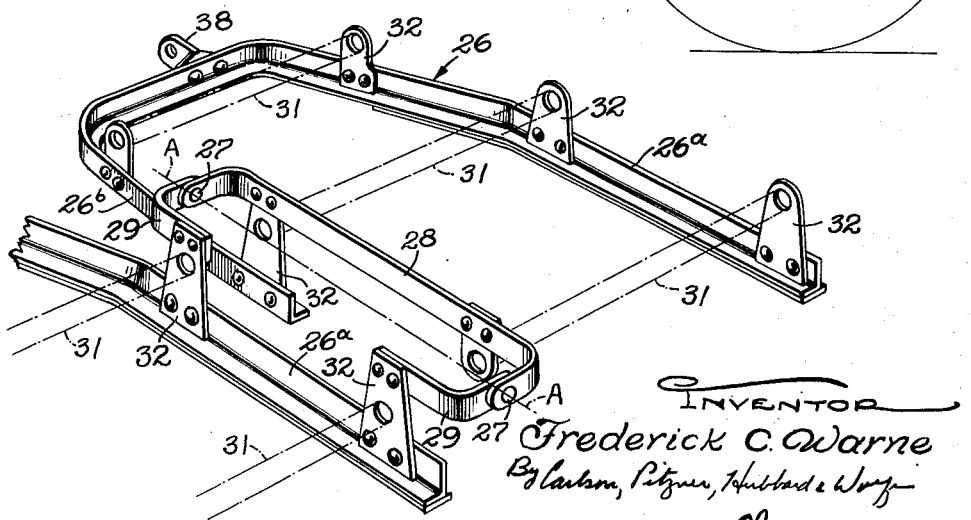

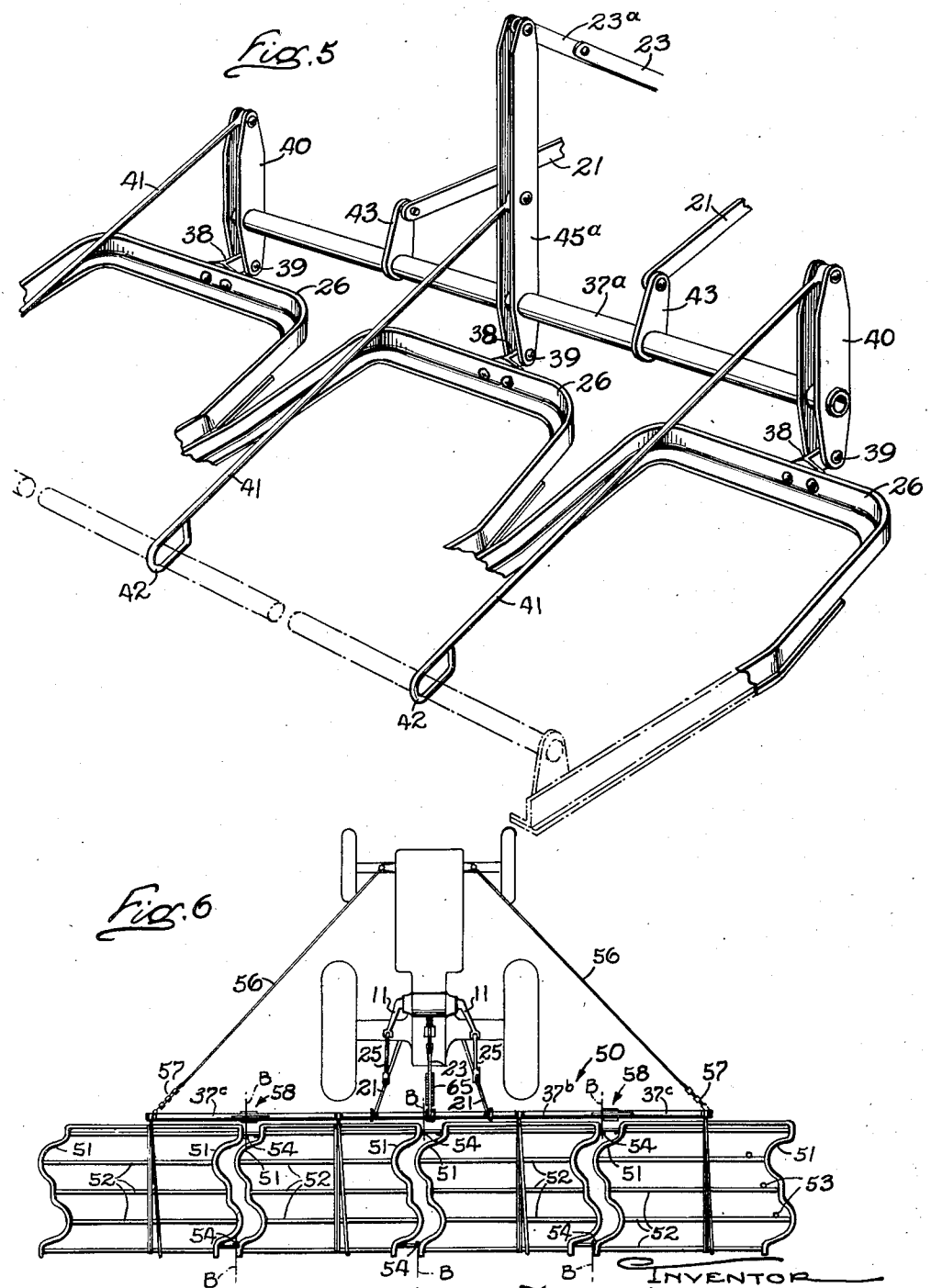

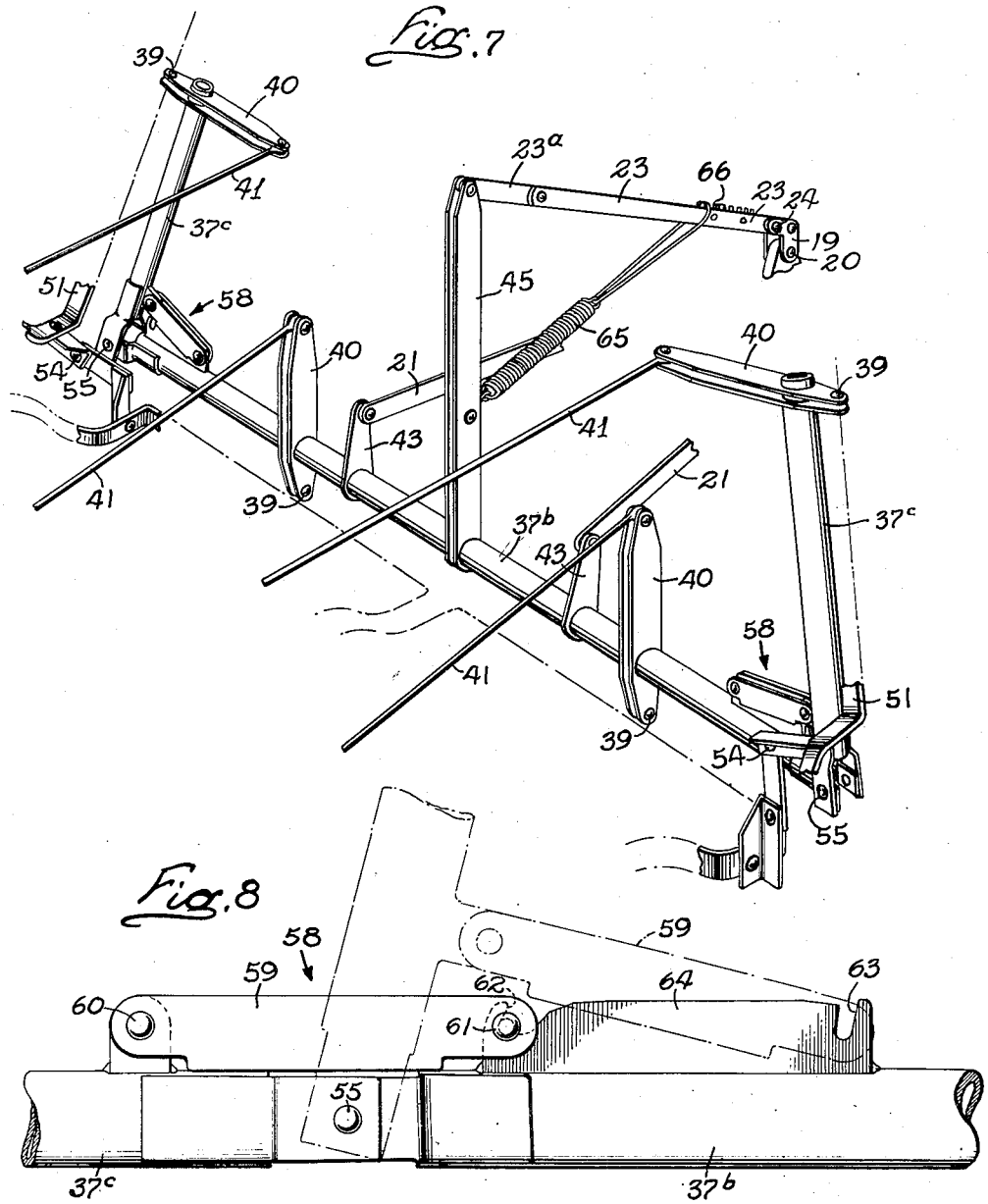

2,655,854

UNITED STATES PATENT OFFICE 2,655,854

TRACTOR-MOUNTED IMPLEMENT

Frederick C. Warne, Mansfield, Ohio, assignor to Farm Tools, Inc., Mansfield, Ohio, a corporation of Indiana Application June 12, 1944, Serial No. 539,850

10 Claims. (Cl. 97—46.07)

The present invention pertains to tractor drawn implements and to a novel connecting mechanism adapted to be embodied in the same.

The general aim of the invention is to provide in an implement requiring a low line of draft a novel connecting mechanism for hitching the same to a tractor to afford not only proper application of draft while working, but also bodily raising and suspension of the implement for non-working transport.

More particularly stated, it is an object of the invention to provide a low lying implement such as a spring tooth or pin tooth harrow, embodying a novel arrangement for connecting the same for operation from a horizontally spaced pair of power operated tension links trailing pivotally from the rear end of a tractor and a coacting third or compression link disposed on the tractor above such pair.

Another object is to provide an implement of the general character set forth and which embodies a plurality of sections or gangs arranged side by side and all adapted to be connected to a tractor by a single connecting mechanism which they incorporate but with full fredom of lateral tilting movement of the sections relative to each other.

Still another object is to provide a novel connecting mechanism of simplified and rugged construction for attaching low draft lying implements or the like to a tractor.

Further objects and advantages of the invention will become apparent as the following description proceeds, taken in connection with the accompanying drawings in which:

Figure 1 is a perspective view of a spring tooth harrow connected to a tractor by a novel connecting arrangement embodying the present invention.

Figs. 2 and 3 are side elevations of the harrow of Fig. 1 with the rear end portion of the tractor shown fragmentarily in longitudinal section, and with the harrow shown respectively in lowered or working position and in elevated or non-working transport position.

Fig. 4 is a fragmentary detail perspective view of a portion of the frame structure employed in the harrow of Fig. 1.

Fig. 5 is a detail perspective view of a connecting mechanism similar to that included in the apparatus of Fig. 1 except that the same is shown as modified for, and applied to, the section or gang frames of a three-section implement as distinguished from the two-section type illustrated in Fig. 1.

Fig. 6 is a plan view of a tractor with a modified form of implement applied thereto embodying the present invention, such implement in this instance being a four-section pin tooth harrow.

Fig. 7 is an enlarged detail perspective view of the connecting mechanism incorporated in the implement of Fig. 6, the end or wing sections of the drawbar being shown latched in the elevated position which they occupy during transport.

Fig. 8 is an enlarged detail view of the lefthand one of the latch devices included in the mechanism of Fig. 7, indicating in full lines the position the parts occupy when the corresponding wing or end section of the drawbar is located in horizontal or working position, and in broken lines the alternative position the parts occupy when such drawbar section is swung upward for transport.

While the invention is susceptible of various modifications and alternative constructions, I have shown in the drawings and will herein describe in detail certain preferred embodiments, but it is to be understood that I do not thereby intend to limit the invention to the specific forms disclosed, but intend to cover all modifications and alternative constructions falling within the spirit and scope of the invention as expressed in the appended claims.

Referring more particularly to the drawings, the invention has been shown in Fig. 1 as applied in a tractor drawn spring tooth harrow designated generally as 10 (see also Figs. 2, 3 and 4). The tractor itself may, of course, take a variety of forms and that illustrated herein was chosen simply as being one of well-known commercial design. It embodies, in addition to the usual tractor mechanisms, a power operated lift means which includes a pair of arms 11 fixed to a transverse shaft 12 to swing in unison through a limited arc.

The construction and operation of this and comparable units which afford a source of auxiliary power on the tractor is well-known in the art. For purposes of exemplification and identification, the power unit shown here is substantially the same as that disclosed in Ferguson Patent No. 2,118,180, issued May 24, 1938. A detailed description of the construction and operation thereof is accordingly unnecessary. For the present, suffice it to say that a hydraulic ram indicated at 13 acts through a suitable linkage 14 and the shaft 12 to swing the arms 11 upwardly upon the application of pressure fluid to the ram. Exhausting fluid from the ram permits the arms to descend. The supply and exhausting of pressure fluid to and from the ram for moving the arms 11 may be controlled manually by a lever 15 or by automatic actuation of a valve operating plunger or reversing control member 16. This plunger is biased outwardly by a compression spring 17 and is connected at its outer end by a pivot 18 to the center point of a rigidly joined pair of bell cranks 19, pivoted as at 20 at the rear of the tractor to swing fore and aft. An inward thrust on the plunger 16 causes pressure fluid to be admitted to the ram to elevate the arms 11 to the position shown in Fig. 3. Conversely, outward movement of the plunger 16 causes fluid to be bled from the ram to permit descent of the arms 11 to a lowered position as shown in Fig. 2.

Coacting with the hydraulic power means just described is a set of three links, the same being mounted on the tractor in the same general manner as the corresponding linkage shown in said Ferguson Patent No. 2,118,180 referred to above. Such linkage includes a pair of tension links 21 projecting in laterally spaced relation from the rear of the tractor and pivoted at 22 on the latter to swing laterally, as well as for vertical movement about a horizontal axis lying beneath and somewhat forward of the rear axle. Located generally centrally above this pair of tension links 21, and also projecting rearwardly from the tractor, is a third or compression link 23 pivoted at 24 between the outer ends of the bell cranks 19 to swing laterally and vertically. The tension links 21 are adapted to be raised by the power operated lifter arms 11, being suspended from the latter by depending connecting links 25 which are pivotally connected at their upper ends to the lifter arms and at their lower ends to intermediate portions of the tension links 21. It is to such a tractor mounted linkage as that just described that the exemplary forms of connecting mechanism embodying the present invention have been shown as adapted to connect various forms of implements.

It is the connecting mechanism embodied in it which primarily distinguishes the harrow 10 of Fig. 1 from conventional spring tooth harrows. The connecting arrangement embodied in this implement is, in general, such as to effect not only a proper application of draft while working but also bodily lifting of the implement for transport, all through the medium of the linkage 21, 23. This harrow 10 typifies low lying implements, or, in other words, those requiring a low line of draft, constituting the general class for use in which the present invention is particularly adapted.

The specific form of harrow 10 illustrated embodies a plurality of sections or gangs (here shown as two) disposed side by side and comprising respective reenforced angle iron border frames 26. The two frames are of generally U-shape, the righthand one (as viewed in Fig. 4) differing from the companion one slightly in that it has a left leg 26b that is shorter than the other leg 26a, the short leg being, in effect, completed by a bar 28. To facilitate the passage of the implement over rough or uneven ground, the frames 26 are pivotally connected to each other for relative transverse tilting movement about a longitudinal generally horizontally extending axis indicated at A—A in Fig. 4. For that purpose pivots 27 lying on such axis are provided between the ends of the bar 28 fixed to the righthand frame and a corresponding pair of straps 29 fixed to the lefthand frame.

Harrow spring teeth 30 of familiar form are fixed to the usual transverse shafts 31 journaled in upright pedestals or brackets 32 on the border frames 26. Adjustment of the setting of the harrow teeth is accomplished by manual operating levers 33, one for each gang. These levers are rigid with the rearmost ones of the shafts 31 of their respective sections and are pivotally connected intermediate their ends to longitudinal connecting links 34 pivoted to arms 35 rigid with respective ones of the other shafts 31. Notched quadrants 36 rigid with the links 34 coact with releasable latches on the levers 33 to hold such levers in selected positions of angular adjustment.

Extending across the front ends of the frames 26, and at a level somewhat above the same, is a transverse drawbar 37 of heavy and very rigid tubular form. The frames 26 are individually connected to this drawbar in a manner to leave them free to tilt laterally with respect to each other about the axis A—A and also to tilt in a fore and aft direction relative to the drawbar as they pass over the ground, although the frames are restrained against any substantial lateral swinging motion in a horizontal plane relative to the drawbar. For such purpose each of the frames 26 is provided with a forwardly projecting apertured lug 38 on its front end (see Fig. 4) connected by a pivot pin 39 with the lower end of a corresponding upright arm 40 which is rigidly fixed intermediate its ends with the drawbar 37. Each of the upright arms 40 consists, in the present instance, of a pair of closely spaced plates or bars and between the lower ends of which the apertured lugs 38 are received.

The upper ends of the arms 40 are connected to the rear portions of the implement sections or gangs in such manner that upon lifting of the drawbar 37, lifting force will be applied to the rear ends of the sections, as well as to the front ends, thus effecting bodily lifting of the implement as a whole. For that purpose rods 41 are pivotally connected to the upper ends of the arms 40 and extend rearwardly and downwardly from the latter. The opposite or rear ends of these rods 41 are fashioned in the form of elongated loops 42 embracing the rearmost ones of the transverse shafts 31 of the corresponding implement sections. The loops 42 permit lost motion movement between the rods and shafts 31 so that the rods 41 with their looped ends constitute, in effect, lost motion type tension transmitting connections. The reason for affording lost motion in these connections is to insure freedom of limited fore and aft tilting of the frames 26 relative to the drawbars while the implement is resting on the ground in working position.

To connect the low lying drawbar 37 to the tension links 21 on the tractor, a pair of arms 43 are rigidly attached to the drawbar at points spaced laterally a distance appropriate to the lateral spacing of the links. The arms 43 are generally upright although canted forward somewhat and their upper ends have detachable pivotal connections at 44 with the trailing ends of the links 21. The drawbar 37 is, on the other hand, connected to the upper or compression link 23 through a central upright arm 45 consisting of a pair of closely spaced bars or plates rigid with the center of the drawbar. Pivotal connection of the upper end of this arm 45 to the trailing end of the compression link 23 is in the present instance (see Fig. 1) accomplished through a short extension link 23a attached to the latter to accommodate the dimensions of the particular parts shown.

As to the operation of the apparatus described, it may be assumed first of all that the tractor is moving forward and that hydraulic pressure has been relieved on the ram 13 so that the lifter arms 11, together with the tension links 21, are free to swing downward to the positions shown in Figs. 1 and 2. In such case the weight of the implement 10 pulls the links 21 downward so that the implement rests on the ground substantially in the working position shown in Figs. 1 and 2. As the tractor moves forward the implement is dragged along with the teeth 30 penetrating the ground. The draft load on the frames 26 is transmitted to the pivots 39 and through the lower portions of the arms 40 to the drawbar 37. From the latter it is applied through the arms 43 to the tension links 21. Upon steering of the tractor to right or left, the implement is trailed accurately behind it. If the ground is rough or uneven, however, the frames 26 are free to tilt relative to each other about the axis A—A and also to tilt in a fore and aft direction relative to the drawbar, such motion being unimpeded by the connecting rods 41 in view of the loose engagement of the loops 42 with the shafts 31.

The tendency of the drawbar 37 to turn in a forward direction (i. e., clockwise as viewed in Fig. 2) resulting from the application of draft load thereto through the lever arm constituted by the lower portions of the arms 40 results in the application of a compression force to the link 23 through the upright arm 45, the latter tending to swing forwardly. Such compression load on the upper link 23, in coaction with the tension load on the lower links 21, serves to increase the tractive effect of the rear wheels of the tractor.

When the driver desires to lift the implement 10 into the transport position shown in Fig. 3, either when the tractor is in motion or at rest, he has only to pull back on the control lever 15 of the hydraulic power lift. Thereupon pressure fluid is supplied to the ram 13, causing the arms 11 to swing upward and carrying with them the links 21. As the links 21 rise they carry with them the drawbar 37 and attached forward end of the implement. During the initial portion of the rising movement of the drawbar, the implement frames 26 tilt rearwardly slightly until the rearmost shafts 31 are seated in the rear ends of the rod loops 42. Thereafter continued upward motion of the drawbar applies a lifting force in tension through the rods 41 to the rear portion of the implement so that the implement is lifted bodily into the transport position shown (Fig. 3). It will thus be seen that the drawbar 37, together with the various upright arms 40, 43 and 45 attached to it, constitutes in effect a generally upright framework adapted for detachable connection at appropriate points to the linkage 21, 23 on the tractor, such upright framework being movable generally vertically in response to upward swinging of the linkage. At the same time the connections from such upright framework to the trailing implement section frames effect bodily lifting and lowering of them as the upright framework is lifted or lowered while still permitting the section frames a high degree of individual freedom of movement while working.

In the event that the implement comprises an odd number of frames rather than an even number, a depending extension on the central upright arm fixed to the drawbar is utilized in connecting the center frame to the drawbar. For example, the implement may comprise three section frames 26 as indicated in Fig. 5 rather than two such frames as shown in Fig. 1. In such case the parts mounted on the frames themselves may, for example, be identical with those heretofore described and consequently further detailing is unnecessary. The connecting arrangement is substantially the same as before except that the drawbar 37a in Fig. 5, corresponding to the previously described drawbar 37, is somewhat longer and provision is made for attaching the central one of the frames 26 to the central upright arm 45a. The latter is exactly like the corresponding arm 45 except that its lower end portion is extended downward beneath the drawbar and has pivoted thereto at 39 the lug 38 on the central frame 26. The rod 41 for effecting lifting of this central frame is pivoted at its forward end to an intermediate portion of the arm 45a. Upright arms 40 for the other two section frames 26 are fixed to the drawbar 37a just as before, as are the arms 43 for connecting the drawbar to the tension links 21. The operation of such an arrangement is, as will be evident, the same as that heretofore described for the two-section implement of Fig. 1.

For very wide harrows or like implements it is desirable that provision be made for folding in the extreme end or side sections over the more centrally located ones during transport so as to facilitate passage through narrow lanes and to increase stability. Fig. 6 shows a plan view of a tractor drawing an implement 50, in this case a pin tooth harrow rather than a spring tooth harrow, equipped for the purpose noted. In this particular instance the harrow 50 is shown as comprising four identical gangs or sections each embodying a pair of frame members 51 joined by a plurality of transverse bars 52. Fixed to these bars are the usual depending spike-shaped harrow teeth or pins 53. The frame ends 51 are of more or less sinusoidal shape in order to effect a lateral offset of the pins with respect to each other in successive rows. The adjacent ends of the harrow sections are pivoted to each other at 54 for relative tilting motion about longitudinal axes B—B.

In this instance the drawbar consists of an elongated central section 37b and two wing or end sections 37c, the latter being hinged to the ends of the central section to swing upward and slightly inward with reference to the same by pivot pins 55 (see also Fig. 7). The central drawbar section 37b is connected to the tractor-mounted linkage 21, 23 by arms 43 and 45 identical with the correspondingly numbered parts heretofore described. Similarly, the frames of the two central sections are connected to the drawbar section 37b by arms 40, rods 41 and pivot connections identical with the correspondingly numbered parts, heretofore described, and the extreme end section frames are connected in a like manner to the drawbar end sections 37c. Stabilizing connections are provided between the extreme outer ends of the drawbar sections 37c and the forward end of the tractor comprising rods 56 and short lengths of chain 57 (Fig. 6).

Secure locking of the drawbar sections 37c and their attached implement frames in either raised or lowered position is accomplished by latch mechanisms 58. As appears in Figs. 7 and 8, each of these latch mechanisms may comprise a pair of bars 59 pivoted at 60 on the corresponding drawbar section 37c and having their outer ends joined by a transverse pin 61 adapted to be received in alternative ones of a pair of notches 62, 63, in a fin or plate 64 fixed to the central drawbar section 37b. When the pin 61 is received in the slot 62 the swingable drawbar section 37c is locked against swinging downward out of alignment with the central section 37b, whereas when the pin 61 is engaged with the other notch 63 the drawbar section 37c is held in the infolded position shown in broken lines in Fig. 8 and in full lines in Fig. 7.

To adjust the implement 50 for transport the operator grasps the frames of the outer sections, one after another, and swings them upward and inward slightly beyond a full vertical position. In the course of such movement each latch pin 61 rides freely up along the sloped inner face of the notch 62 simply as an incident to raising of the outer section (rather than having to be separately freed) and moves on over into engagement with the other slot 63. Then he gets back on the tractor and pulls back the hydraulic control lever 15, raising the lifter arms 11 and attached links 21 so that the central section 37b of the drawbar is elevated. In this way the entire implement 50 is elevated in folded condition and can be transported readily even at fairly high speed.

Provision is also desirably made in the case of such large and heavy implements as the pin tooth harrow shown to prevent the weight of the implement from causing the fore portion of the same from nosing into the ground unduly. To that end a yieldable connection is desirably provided for transferring a portion of the weight to the compression link 23 and thus partially relieving the load on the tension links 21. In the illustrative construction a contractile spring 65 is arranged with its opposite ends anchored respectively to intermediate portions of the upright arm 45 and the compression link 23. To anchor the spring to the latter link the loop on the upper end of the spring is placed in the large notch 66 in an upstanding plate fixed to the link.

From the foregoing it will be seen that the present invention is applicable to a variety of implements and may be readily adapted for use with implements employing varying numbers of side by side sections or gangs. In all instances, however, a simple, low cost arrangement is provided for connecting a low lying or drag type implement in trailed relation to a tractor and in a manner which facilitates a maximum freedom of movement of the individual implement sections relative to each other as required to meet changes in ground contour while still causing them to trail properly in following the tractor, together with provision for complete bodily lifting and lowering between alternative transport and working positions.

I claim as my invention:

1. In a ground working implement, the combination of a generally horizontal frame having ground working means thereon, a transverse drawbar adjacent the front end of said frame, means including generally upright members rigid with said drawbar and projecting upwardly therefrom, said generally upright members together with said drawbar being susceptible of attachment in depending relation to the rear ends of vertically movable power operated links trailing from the rear end portion of a tractor at points above the drawbar, an upstanding arm rigidly fixed intermediate its ends to said drawbar, means pivotally connecting the lower end of said arm to the forward end of said frame for fore and aft tilting movement of the frame as it is trailed behind the drawbar, and a lost motion type tension transmitting connection between the upper end of said arm and the rear portion of said frame for effecting bodily elevation of the rear end of said frame to transport position upon elevation of said drawbar.

2. In a ground working implement for use with a tractor having a pair of vertically movable draft links and having a compression link centered above them and all trailingly pivoted to the tractor, the combination of a plurality of frames disposed side by side, each having ground working means thereon and connected for lateral tilting motion relative to each other about a longitudinally extending generally horizontal axis, a substantially rigid transverse drawbar adjacent the front ends of said frames, means including generally upright members rigid with said drawbar and projecting upwardly therefrom for attachment of the latter to the rear ends of said links in a plane above the drawbar, and means pivotally connecting the forward edge portions of said frames in trailed relation to said drawbar for fore and aft tilting movement with respect thereto while restraining said frames against lateral swing relative to said drawbar in a horizontal plane.

3. In a ground working implement for use with a tractor having a pair of lower draft links and a compression link centered above them in trailing relation to the tractor, the combination of a generally horizontal frame having ground working means thereon, a transverse drawbar adjacent the front end of said frame, means including generally upright members rigid with said drawbar and projecting upwardly therefrom for attachment in depending relation to the rear ends of said draft links and said compression link respectively, a generally upright arm rigidly secured intermediate its ends to said drawbar, means pivotally connecting the lower end of said arm to the forward end of said frame, and a lost motion type tension transmitting connection between the upper end of said arm and the rear end of said frame, said compression link serving to resist the torque about the ends of said draft links produced by the draft load of said frame.

4. In a ground working implement, the combination of a generally horizontal frame having ground working means thereon, a transverse drawbar adjacent the front end of said frame, a plurality of upright members rigid with said drawbar and projecting upwardly therefrom, means on the upper end portions of certain ones of said upright members for pivotal attachment to the rear ends of vertically spaced power elevated links trailing from the rear end portion of a tractor at points above the drawbar, said certain ones of said upright members being susceptible of attachment in depending relation to said links, means pivotally connecting the forward end of said frame in trailed relation to said drawbar for fore and aft tilting movement with respect thereto, and a lost motion type tension transmitting connection between the rear portion of said frame and a portion of at least one of said upright members at a point on the latter located above the drawbar for effecting bodily lifting of said rear portion of the frame to transport position upon elevation of said drawbar.

5. In a ground working implement, the combination of a plurality of frames disposed side by side each having ground working means thereon and connected for lateral tilting motion relative to each other about a longitudinally extending generally horizontal axis, a transverse drawbar adjacent the front ends of said frames, a plurality of generally upright members rigid with said drawbar and projecting upwardly therefrom, means on the upper portions of at least a part of said members for pivotal attachment to the rear ends of vertically spaced power elevated links trailing from the rear end portion of a tractor at points above the drawbar, means on said drawbar for pivotally connecting the forward ends of said frames in trailed relation to said drawbar for fore and aft tilting movement of the frames with respect to the drawbar, and lost motion type tension transmitting connections between the rear end portions of respective ones of said frames and corresponding ones of said upright members at points on the latter located above said drawbar.

6. In a hitch for a tractor drawn device, the combination of a generally horizontal drawbar, a central arm on the drawbar and a pair of shorter arms disposed on opposite sides thereof, all of said arms being fixed rigidly to the drawbar in substantially upright positions for attachment of their respective upper ends in depending relation to the triangularly disposed rear ends of a set of three links trailing from a tractor, additional generally vertical arms fixed to said drawbar and having opposite end portions extending upward and downward from the latter, means for pivotally attaching a trailing implement frame or the like on the downwardly extending portions of said additional arms, and lost motion type tension transmitting connections between the upward extending portions of said additional arms and the rear end portion of said implement frame.

7. In a hitch for a tractor drawn device, the combination of a generally horizontal drawbar, a central arm on the drawbar and a pair of shorter arms disposed on opposite sides thereof, all of said arms being fixed rigidly to the drawbar in substantially upright positions for attachment of their respective upper ends in depending relation to the triangularly disposed rear ends of a set of three links trailing from a tractor, a plurality of additional substantially upright arms fixed to said drawbar at spaced points intermediate their ends, means on the lower ends of said additional arms for pivotally attaching the fore portion of implement frames or the like, and lost motion tension transmitting type connections pivoted on the upper ends of said additional arms and trailing therefrom for attachment to the rear end portions of implement frames or the like.

8. In a ground working implement attachment for a tractor having a pair of laterally spaced pivoted links trailing from its rear end portion together with a hydraulic power lift for swinging said links upward and a movable hydraulic control element therefor, the combination of a drawbar, means for detachably and pivotally connecting said drawbar in depending relation to said links in position to extend transversely therebetween, a ground engaging member connected in trailed relation to said drawbar so that at least the front portion of the ground engaging member is raised in unison therewith, means including a generally upright arm rigid with the center portion of the drawbar for imparting movement to the control element on the tractor in response to movement of said drawbar under the influence of the drag load of said ground engaging member, and a lost motion type tension transmitting connection between said upright arm and the rear portion of said member whereby that portion of the member is raised in unison with the drawbar.

9. In a mechanism adapted to be trailed from a tractor having a pair of laterally spaced and rearwardly extending tension links pivoted on its rear end for power actuated vertical swinging motion and a compression link located generally centrally above said tension links and also pivoted on the tractor to project rearwardly of the same for vertical swinging motion, the combination of a drawbar, means on said drawbar for detachably connecting said drawbar to the tension links in position to extend transversely between them, a frame connected in trailed relation to said drawbar, an upright arm rigid with the central portion of said drawbar having means on its upper end for pivotally connecting the same to the trailing end of said compression link, a contractile spring, and means on the intermediate portions of said upright arm and said compression link respectively for anchoring the respective opposite ends of said spring.

10. In a ground working implement for attachment to a tractor having a pair of laterally spaced trailing draft links and a compression link arranged above them in generally a parallel relation, said tractor also including a power lift device for elevating said draft links in response to an increase in compressive force in said compression link, the combination comprising: a drawbar, means for detachably and pivotally connecting said drawbar to said draft links in depending relation therewith and in position to extend transversely therebetween, a ground engaging member, means for pivotally connecting said ground engaging member to said drawbar below the pivotal connection of said draft links and so that at least the front portion of said ground engaging member is raised in unison with the drawbar, means including an arm rigid with the center portion of the drawbar and extending upwardly into engagement with the trailing end of said compression link for compressing the latter in response to movement of said drawbar under the influence of the drag load of said ground engaging member, and a lost motion type tension transmitting connection extending from said arm to the rear portion of said ground engaging member so that the rear portion of the member is also raised in unison with the drawbar.

FREDERICK C. WARNE.

References Cited in the file of this patent

UNITED STATES PATENTS

| Number | Name | Date |
| --- | --- | --- |
| 206,490 | Schaumburg | July 30, 1878 |
| 928,046 | Hari | July 13, 1909 |
| 1,034,753 | Adix | Aug. 6, 1912 |
| 1,308,938 | Donovan | July 8, 1919 |
| 1,464,541 | Rowland | Aug. 14, 1923 |
| 1,689,759 | Wolf | Oct. 30, 1928 |
| 1,900,440 | Ferguson | Mar. 7, 1933 |
| 2,005,555 | Morkovski | June 18, 1935 |
| 2,247,534 | Von Schlegell | July 1, 1941 |
| 2,309,750 | Carrington | Feb. 2, 1943 |
| 2,312,258 | Martin | Feb. 23, 1943 |
| 2,320,141 | Kott | May 25, 1943 |
| 2,321,516 | Robertson | June 8, 1943 |
| 2,333,881 | Phillips | Nov. 9, 1943 |
| 2,398,147 | McKay | Apr. 9, 1946 |